(12) United States Patent
Ichikawa et al.

(10) Patent No.: US 7,138,003 B2
(45) Date of Patent: Nov. 21, 2006

(54) HONEYCOMB STRUCTURE

(75) Inventors: Yukihito Ichikawa, Nagoya (JP); Tatsuyuki Kuki, Kasugai (JP)

(73) Assignee: NGK Insulators, Ltd, Nagoya (JP)

( * ) Notice: Subject to any disclaimer, the term of this patent is extended or adjusted under 35 U.S.C. 154(b) by 322 days.

(21) Appl. No.: 10/781,728

(22) Filed: Feb. 20, 2004

(65) Prior Publication Data

US 2004/0177600 A1    Sep. 16, 2004

(30) Foreign Application Priority Data

Mar. 10, 2003   (JP) .............................. 2003-063022

(51) Int. Cl.
    *B01D 46/00*    (2006.01)
(52) U.S. Cl. ................. 55/523; 55/282.2; 55/282.3; 55/385.3; 55/524; 55/DIG. 10; 55/DIG. 30; 428/116; 60/311; 502/439
(58) Field of Classification Search ............ 55/282.2, 55/282.3, 385.3, 523, 524, DIG. 10, DIG. 30; 428/116, 117, 118; 60/311; 502/439
See application file for complete search history.

(56) References Cited

U.S. PATENT DOCUMENTS

| 3,505,158 A | 4/1970 | Murray | |
|---|---|---|---|
| 4,455,336 A * | 6/1984 | Ogawa et al. | 428/116 |
| 6,596,372 B1 * | 7/2003 | Ito et al. | 428/116 |
| 6,803,086 B1 * | 10/2004 | Noguchi et al. | 428/116 |
| 2004/0244344 A1 * | 12/2004 | Ichikawa | 55/523 |
| 2005/0102987 A1 * | 5/2005 | Kudo | 55/523 |
| 2005/0235622 A1 * | 10/2005 | Cutler et al. | 55/523 |

FOREIGN PATENT DOCUMENTS

| EP | 1 415 779 A1 | | 5/2004 |
|---|---|---|---|
| EP | 1 440 722 A1 | | 7/2004 |
| EP | 1 486 243 A1 | | 12/2004 |
| JP | 1-145377 | * | 6/1989 |
| JP | A 4-301114 | | 10/1992 |
| JP | A 8-28246 | | 1/1996 |
| JP | 2003-25316 | * | 1/2003 |
| JP | 2006-16991 | * | 1/2006 |
| WO | WO 03/031023 | | 4/2003 |
| WO | WO 03/078027 | | 9/2003 |

* cited by examiner

*Primary Examiner*—Jason M. Greene
(74) *Attorney, Agent, or Firm*—Oliff & Berridge, PLC

(57) ABSTRACT

A honeycomb structure comprising porous partition walls disposed so as to form a plurality of cells extending in an axial direction. In the honeycomb structure, defining that a porosity and pore diameter of the partition walls in a central portion is (Pi) and (Di), a porosity and pore diameter of the partition walls in an outer peripheral portion is (Po) and (Do), (Pi) and (Po) have a relation of (Pi<Po); or (Pi) and (Po) have a relation of (Pi>Po) and (Di) and (Do) have a relation of (Di<Do).

9 Claims, 3 Drawing Sheets

HONEYCOMB STRUCTURE

BACKGROUND OF THE INVENTION

1. Field of the Invention

The present invention relates to a honeycomb structure, particularly to a honeycomb structure which is preferably usable as a filter for purifying an exhaust gas or a catalyst carrier.

2. Description of the Related Art

In recent years, influences of particulate matter or NOx discharged from an engine for an automobile, especially a diesel engine or the like onto environments have been remarkably brought into the public eye, and the use of a honeycomb structure including porous partition walls has variously been studied as important means for removing these noxious materials.

For example, a honeycomb structure for a filter (hereinafter referred to as DPF) for filtering the particulate matter discharged from the diesel engine has been developed. The honeycomb structure for DPF generally includes porous partition walls disposed so as to form a plurality of cells extending in an axial direction, and the cells disposed adjacent to each other via the partition wall are plugged in end faces opposite to each other. Moreover, an exhaust gas is introduced into the cell which opens in one end face, and is passed through the partition wall in the honeycomb structure, so that the particulate matter in the exhaust gas can be filtrated and removed (see JP-A-4-301114).

For such a honeycomb structure, gas flows of central and outer peripheral portions in a vertical section with respect to the axial direction (longitudinal direction of the cell) are desired to be uniform from the standpoints of enhancement of efficiency of the filter and reduction of pressure loss. It is also necessary to periodically burn and remove the particulate matter deposited on the partition wall and to regenerate the filter, and a catalyst used for such a purpose is also desired to be quickly activated as needed. At the time of the burning of the particulate matter, the generation of cracks by a thermal stress caused by a higher temperature at the central portion sometimes raises a problem, and it has also been desired that the cracks are not easily generated.

To prevent the cracks by the thermal stress, there has been proposed a method in which a plurality of segments obtained by dividing a honeycomb filter are bonded by a bonding material. For example, there is disclosed a ceramic honeycomb structure obtained by bonding honeycomb ceramic members with an elastic sealant made of at least a three-dimensionally intertwined inorganic fiber, an inorganic binder, an organic binder and inorganic particles (see JP-A-8-28246).

However, when the filter is segmented and bonded, an extra step is required, and further the presence of a bonding layer that does not function as the filter lowers the efficiency of the filter. Therefore, there has been a demand for a honeycomb structure which can meet the above-described requirement, even when not segmented.

SUMMARY OF THE INVENTION

The present invention has been developed in consideration of the situations, and a first feature thereof is to provide a honeycomb structure which is capable of suppressing a temperature rise of a central portion to reduce cracks at the time of regeneration. A second feature is to provide a honeycomb structure in which particulate matter can quickly be burnt.

According to a first aspect of the present invention, there is provided a honeycomb structure comprising a porous partition walls disposed so as to form a plurality of cells extending in an axial direction, wherein defining that a porosity of the partition walls in a central portion of a vertical section with respect to the axial direction of the honeycomb structure is Pi and that a porosity of the partition walls in an outer peripheral portion of the section is Po, the honeycomb structure has a relation of (Pi<Po). In the first aspect, defining that a pore diameter of the partition walls in the central portion is Di and that a pore diameter of the partition walls in the outer peripheral portion is Do, a relation of (Di>Do) is preferable. A relation of (Di<Do) is also preferable.

According to a second aspect of the present invention, there is provided a honeycomb structure comprising a porous partition walls disposed so as to form a plurality of cells extending in an axial direction, wherein defining that a porosity and a pore diameter of the partition walls in a central portion of a vertical section with respect to the axial direction of the honeycomb structure are Pi and Di and that a porosity and a pore diameter of the partition walls in an outer peripheral portion of the section are Po and Do, the honeycomb structure has a relation of (Pi>Po) and (Di<Do).

In the first and second aspects of the present invention, predetermined cells are preferably plugged in either of end faces of the honeycomb structure, Also the honeycomb structure is preferably monolithically formed.

DESCRIPTION OF THE PREFERRED EMBODIMENTS

A honeycomb structure according to the present invention is described below in detail with reference to the concrete embodiments. However, the present invention is not restricted to the following embodiments. It is to be noted that in the following a section means a vertical section with respect to a longitudinal direction of a cells (e.g. an X-axis direction in FIG. 1) unless otherwise specified.

Figure 1:
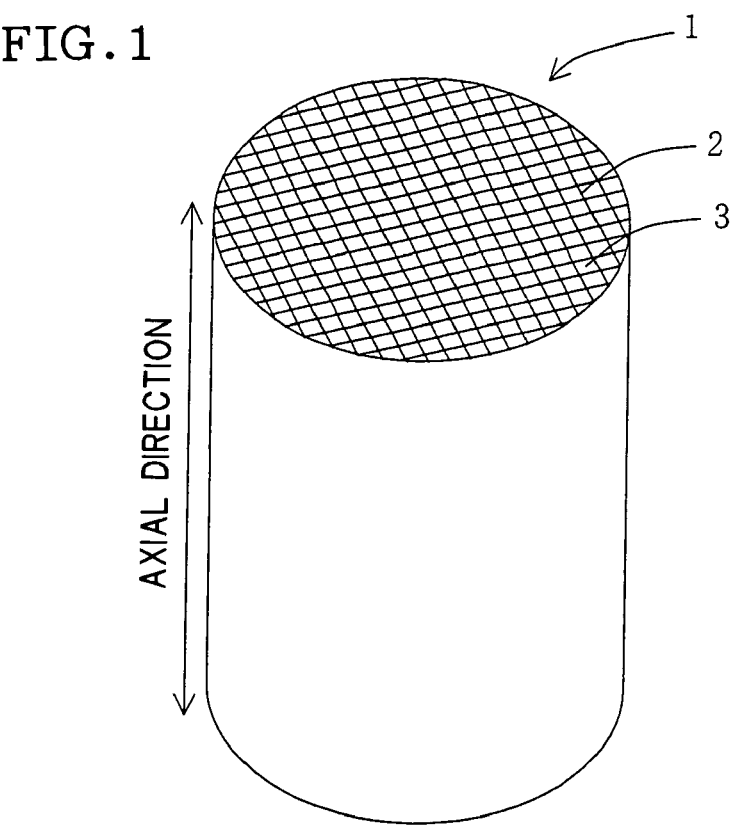
FIG. 1 is a schematic perspective view showing an embodiment of the honeycomb structure of the present invention.
Figure 2:
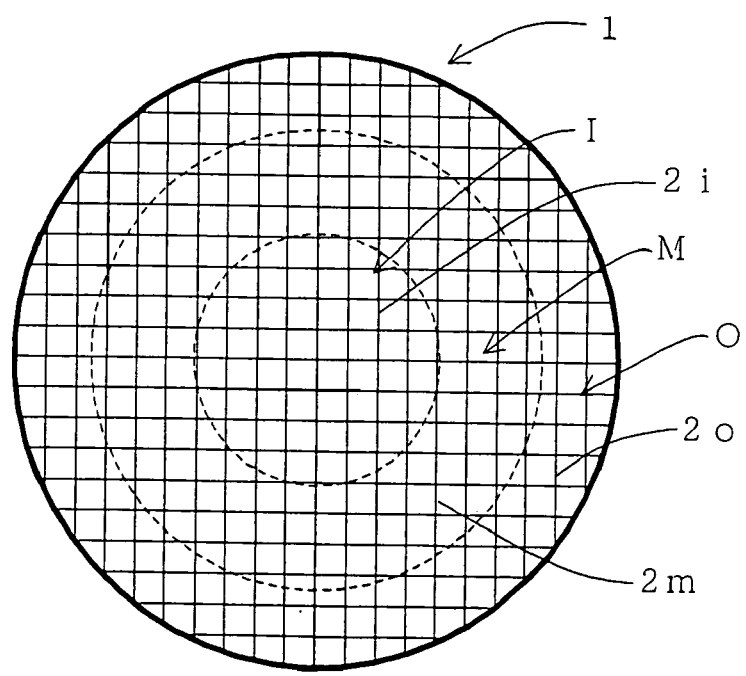
FIG. 2 is a schematic perspective view showing an embodiment of the honeycomb structure of the present invention.

As shown in FIG. 1, a honeycomb structure 1 of the present invention includes a porous partition walls 2 disposed so as to form a plurality of cells 3 extending in an axial direction. Moreover, for characteristics of the first aspect of the present invention, as shown in FIG. 2, a porosity (Pi) of partition walls 2$i$ in a central portion (I) of a section and a porosity (Po) of a partition walls 2$o$ in an outer peripheral portion (O) have a relation of Pi<Po. By satisfying this relation, a heat capacity of the central portion increases. For example, when the structure is used as DPF, and particulate matter deposited on the partition walls is burnt, temperature rise in the central portion is suppressed even though a heat value in the central portion is high. Thus a thermal stress by a temperature difference between the central portion and the outer peripheral portion can be reduced, and cracks at the time of regeneration are not easily generated.

In the present invention, the central portion (I) of the section means a portion occupying 5% or less, preferably 25% or less, further preferably 50% or less of a sectional area from a section center in a given section, and the porosity (Pi) of the partition walls $2i$ in this portion (I) means an average porosity of the partition walls $2i$ existing in this range. The outer peripheral portion (O) includes the cells positioned in an outermost periphery in the same section as the above-described section, and means the portion of 50% or less of the sectional area from an outermost peripheral side. The porosity (Po) of the partition walls $2o$ in this portion (O) means the average porosity of the partition walls $2o$ existing in this range.

In the present invention, as shown in FIG. 2, an intermediate portion (M) may exist between the central portion (I) and the outer peripheral portion (O), and an average porosity (Pm) of partition walls $2m$ in this intermediate portion (M) preferably satisfies a relation of (Pi≦Pm≦Po).

In the first aspect of the present invention, the porosity P is indicated in (%), but when a difference ΔP between numeric values of Po (%) and Pi (%) is excessively small, the effect of the present invention may not be easily realized. Therefore, ΔP is preferably 2 or more, further preferably 3 or more, and especially preferably 5 or more. When ΔP is excessively large, a heat capacity difference increases, a temperature difference increases, and therefore an excessive thermal stress is unfavorably induced. Therefore, the ΔP is preferably 20 or less, more preferably 10 or less. Moreover, when Pi and Po are excessively large, strength of the honeycomb structure excessively drops. When they are excessively small, a pressure loss unfavorably increases. Therefore, Pi and Po are preferably 40 to 90%, more preferably 50 to 80%.

In the first aspect of the present invention, a pore diameter (Di) of the partition walls $2i$ in the central portion (I) and a pore diameter (Do) of the partition walls $2o$ in the outer peripheral portion (O) preferably have a relation of (Di>Do). This is because when the porosity Pi of the partition walls in the central portion (I) is reduced, a resistance of gas passage through the partition walls of the central portion increases. However, by setting Di and Do to be (Di>Do), the increase of the resistance of the central portion is inhibited, and a uniform gas flow can be realized as a whole. Therefore, with this structure, the cracks at the time of the regeneration are not easily generated, air permeability is satisfactorily balanced between the central portion and the outer peripheral portion, and the gas flow can be uniformed.

In this case, a pore diameter (Dm) of a partition walls $2m$ in the intermediate portion (M) preferably satisfies a relation of (Di≧Dm≧Do). Moreover, when the difference between the pore diameters Di and Do is excessively small, the above-described effect cannot easily be obtained. Therefore, the difference between Di and Do is preferably 2 μm or more, further preferably 3 μm or more. When Di and Do are excessively large, a filtration efficiency of the honeycomb structure as the filter unfavorably drops. When they are excessively small, the pressure loss unfavorably increases. Therefore, Di and Do are preferably 5 to 80 μm, more preferably 10 to 40 μm. It is to be noted that the pore diameter in the present invention means the mean pore diameter of the partition walls existing in each portion (the central portion, the outer peripheral portion, the intermediate portion).

Alternatively, the pore diameter (Di) of the partition walls $2i$ in the central portion (I) and the pore diameter (Do) of the partition walls $2o$ in the outer peripheral portion (O) also preferably have a relation of (Di<Do). When the porosity and pore diameter of the outer peripheral portion are relatively increased, much gas can be allowed to flow into the outer peripheral portion in which usually the gas does not easily flow and the temperature does not easily rise. The pressure loss can be reduced as a whole, the temperature of the outer peripheral portion can be raised, and the burning of the particulate matter in the outer peripheral portion can be promoted. Therefore, when it is the big issue that the temperature of the outer peripheral portion of the honeycomb structure does not easily rise by the heat of the outer peripheral portion being easily released to the outside, the above-described structure is preferable.

In this case, the pore diameter (Dm) of the partition walls $2m$ in the intermediate portion (M) preferably satisfies a relation of (Di≦Dm≦Do). Moreover, when the difference between the pore diameters Di and Do is excessively small, the above-described effect cannot easily be obtained. Therefore, the difference between Di and Do is preferably 2 μm or more, further preferably 3 μm or more. Also, by the same reason mentioned above, the Di and Do are preferably 5 to 80 μm, more preferably 10 to 40 μm.

The characteristics of the honeycomb structure according to a second aspect of the present invention lie in that a relation of Pi>Po and Di<Do is satisfied. When this relation is satisfied, the heat capacity of the central portion is reduced. When the deposited particulate matter is burnt, the temperature can quickly reach a burning temperature. A catalyst is sometimes used for lowering a burning temperature of the particulate matter to quickly burn the matter, but even in this case, the temperature can quickly reach a catalyzing temperature. Furthermore, the air permeability is satisfactorily balanced between the central portion and the outer peripheral portion, and the gas flow can be uniformed. Therefore, the honeycomb structure constituted in such a manner is preferably usable, for example, in an exhaust system in which quicker burning start is strongly required.

In this case, by the same reason mentioned above, Pm preferably satisfies a relation of (Pi≧Pm≧Po), and Dm preferably satisfies a relation of (Di≦Dm≦Do). Moreover, ΔP is preferably 2 or more, further preferably 3 or more, and especially preferably 5 or more. Also, Pi and Po are preferably 40 to 90%, more preferably 50 to 80%. Also, a difference between pore diameters Di and Do is preferably 2 μm or more, more preferably 3 μm or more. Also, Di and Do are preferably 5 to 80 μm, more preferably 10 to 40 μm.

In the present invention, the honeycomb structure is preferably monolithically formed. This is because an effect of reducing the cracks is obtained even when the honeycomb structure of the present invention is not segmented to bond the segment. For the monolithically formed honeycomb structure, layers which block the partition walls between the partition walls $2i$ of the central portion and the partition walls $2o$ of the outer peripheral portion, such as a bonding layer of segmented honeycomb structure, do not exist, and the partition walls $2i$ of the central portion is connected to the partition walls $2o$ of the outer peripheral portion via the partition walls. Moreover, since the bonding layer that does not function as a filter or carrier does not exist, the efficiency of the filter or carrier can be raised.

Figure 3A:
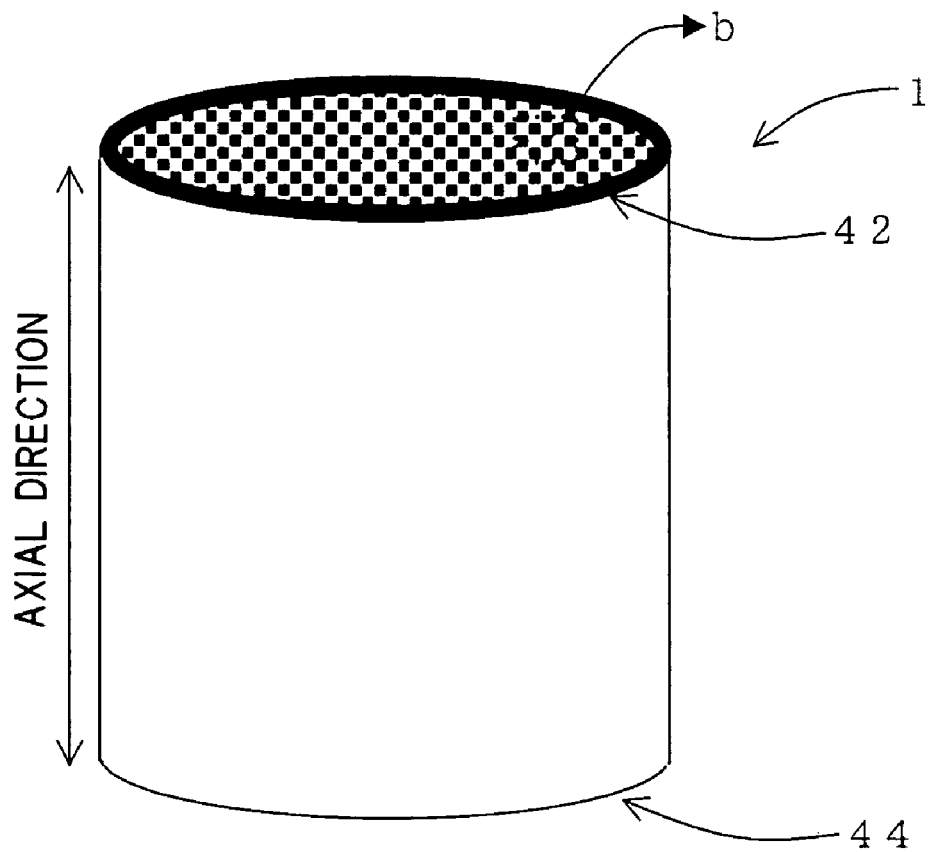
FIG. 3(a) is a schematic perspective view showing another embodiment of the honeycomb structure of the present invention.
Figure 3B:
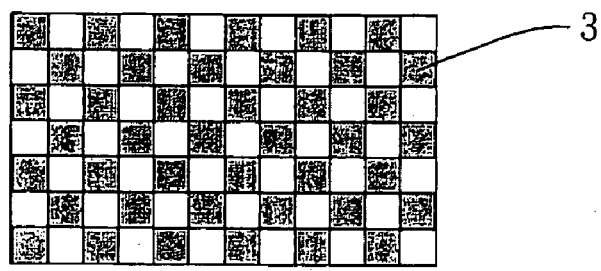
FIG. 3(b) is a partial enlarged view showing portion b in FIG. 3(a).

Especially when the honeycomb structure of the present invention is used as a filter such as DPF, as shown in FIG. 3, predetermined cells 3 are preferably plugged at either of end faces 42 and 44. Especially, it is preferable that in the cells 3 disposed adjacent to each other via the partition wall, each wall is plugged alternately at the end face opposite to each other, so that the end faces 42 and 44 have a checkered pattern.

In the present invention, the main component of the partition walls is preferably at least one kind of material selected from the group consisting of cordierite, mullite, alumina, spinel, silicon carbide, silicon carbide-cordierite type composite material, silicon-silicon carbide type composite material, silicon nitride, lithium aluminum silicate, aluminum titanate, Fe—Cr—Al type metal and a combination thereof, from the standpoints of strength, heat resistance, etc. Cordierite is more preferable from the standpoint of low thermal expansion. The ceramic or a metal which is preferably usable as the main component of the partition walls described above can preferably be used as the main component of the plugging material.

There is no particular restriction as to the thickness of the partition walls. However, too large a thickness results in low treatment capability of a subject fluid and in high pressure loss; too small a thickness results in an insufficient strength of a honeycomb structure. Therefore, such thicknesses are not preferable. The thickness of the partition walls is preferably 100 to 1,000 μm, more preferably 150 to 750 μm, most preferably 250 to 500 μm.

In the honeycomb structure of the present invention, there is no particular restriction as to the sectional shape of cells (cell shape). However, the sectional shape is preferably any of a triangle, a tetragon, a hexagon and a corrugated shape from the standpoint of production. A cell density, that is the number of cells per unit sectional area of the honeycomb structure, is not especially limited. However the cell density is excessively small, strength and effective geometric surface area of the honeycomb structure become insufficient; the cell density is excessively large, a pressure loss increases in a case where a subject fluid, flows. The cell density is in a range of preferably 50 to 1,000 cells/in.$^2$ (7.75 to 155 cells/cm$^2$), more preferably 75 to 500 cells/in.$^2$ (11.6 to 77.5 cells/cm$^2$), most preferably 100 to 400 cells/in.$^2$ (15.5 to 62.0 cells/cm$^2$). The honeycomb structure of the present invention has no particular restriction as to the sectional shape. The sectional shape can be any form, for example circle, ellipse, race-track, oval, polygon such as substantially triangular and substantially tetragonal.

When the honeycomb structure of the present invention is to be used as a catalyst carrier in purifying the exhaust gas of thermal engines such as an internal combustion engine or combustion apparatuses such as a boiler, or in modifying a liquid or gas fuel, the honeycomb structure of the present invention preferably carries catalysts such as a metal having a catalytic capability. Also when the structure is used in the DPF, a catalyst is also preferably loaded so as to lower the burning temperature. Examples of a typical metal having the catalytic capability include Pt, Pd, Rh. It is preferable to load at least one of them on the honeycomb structure.

Next, a method for manufacturing the honeycomb structure of the present invention will be described. First, raw materials forming preferable materials as the main component of the partition walls, for example, cordierite forming raw materials, for example, silica (SiO$_2$) source components such as kaolin, talc, quartz, fused silica and mullite, magnesia (MgO) source components such as talc and magnesite, and alumina (Al$_2$O$_3$) source components such as kaolin, aluminum oxide and aluminum hydroxide are blended to form a theoretical composition of a cordierite crystal. A pore-forming material, binder, dispersant, dispersion medium such as water, and the like are added to the blended materials, and the materials are kneaded, formed into clay, and extruded into a honeycomb structure. The extruded material is dried, followed by firing at a predetermined temperature to obtain the honeycomb structure.

Figure 4:
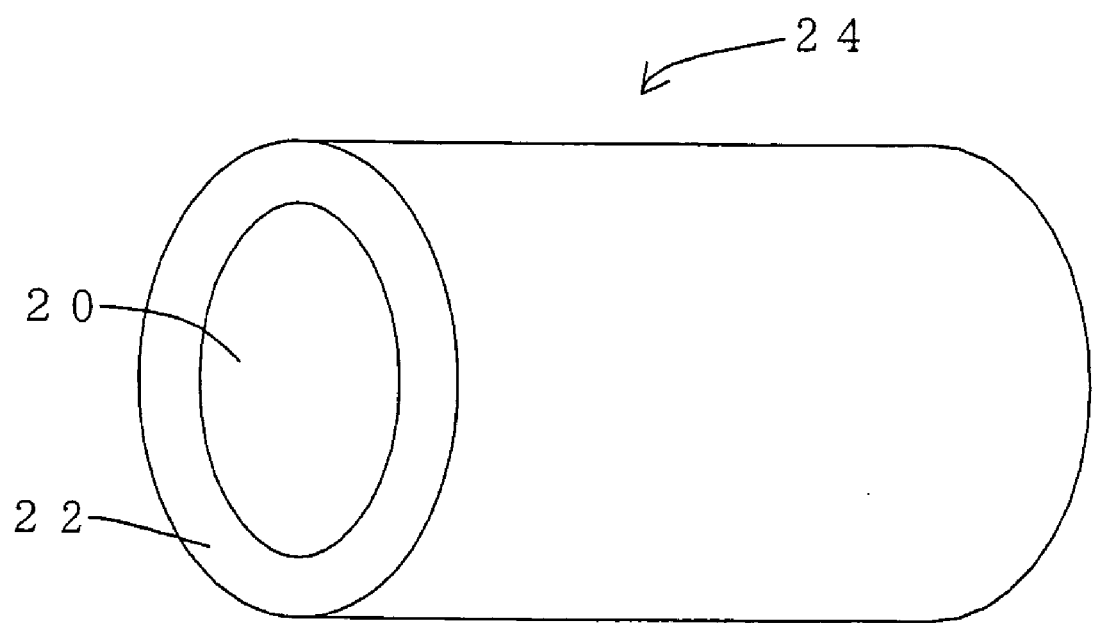
FIG. 4 is a schematic perspective view showing an embodiment of clay in the production of the honeycomb structure according to the present invention.

In this case, two types of clay different, for example, in a particle diameter distribution and content of the pore-forming material are prepared, and are used as central portion clay 20 and outer peripheral portion clay 22 as shown in FIG. 4. Double layer structure cylindrical clay 24 is extruded in the honeycomb shape, followed by drying, and firing so that the honeycomb structure of the present invention can be obtained. Alternatively, it is also possible to form the extruded body by continuous extrusion using an extrusion apparatus having two independent continuous extrusion mechanisms, which can supply one clay from one extrusion mechanism to the central portion of a die and supply the other clay from the other extrusion mechanism to the outer peripheral portion of the die.

Here, examples of the pore-forming material for use can include carbon, foam resin, flour, starch, phenol resin, polymethyl methacrylate, polyethylene, polyethylene terephthalate and the like. The examples of the binder can include hydroxypropylmethylcellulose, methylcellulose, hydroxyethylcellulose, carboxylmethylcellulose, polyvinyl alcohol and the like. The examples of the dispersant can include ethylene glycol, dextrin, fatty acid soap, polyalcohol and the like.

For the blend ratio of the clay, for example, with respect to 100 parts by mass of the raw material which is the main component, 5 to 40 parts by mass of the pore-forming material and 10 to 40 parts by mass of the dispersion medium, as well as 3 to 5 parts by mass of the binder and 0.5 to 2 parts by mass of the dispersant to be added if necessary, are mixed and subsequently kneaded so that the clay can be prepared.

The examples of a method of drying the extruded body can include hot air drying, microwave drying, dielectric drying, reduced pressure drying, vacuum drying, freeze drying and the like. A firing temperature and atmosphere differ with the type of the main component, and any person skilled in the art can select the firing temperature and atmosphere suitable for the selected main component. For example, oxide-based materials such as the cordierite forming raw material are preferably fired usually in the atmospheric environment, and at a temperature of 1400 to 1440° C.

EXAMPLES

The present invention will be described hereinafter in further detail based on examples, but the present invention is not limited to these examples.

(Preparation of Clay)

Carbon, foam resin, binder, surfactant and water were added to the cordierite forming raw material and kneaded to prepare Clay A to E. In this case, the particle diameter distribution and addition amount of carbon were changed, and accordingly the porosity and pore diameter of each fired body from each clay were adjusted to the values shown in Table 1. It is to be noted that the porosity and pore diameter can also be changed by changing the particle diameter distribution and addition amount of foam resin or both of carbon and foam resin, and either method may also be used.

TABLE 1

|  | Porosity (%) | Pore Diameter (μm) |
|---|---|---|
| Clay A | 60 | 20 |
| Clay B | 65 | 20 |
| Clay C | 60 | 25 |
| Clay D | 65 | 25 |
| Clay E | 61 | 21 |

Example 1

Clay B was extruded in a cylindrical shape and Clay C was wound around the Clay B to form the double layer structure cylindrical clay 24 including the central portion clay 20 corresponding to Clay B and the outer peripheral portion clay 22 corresponding to Clay C as shown in FIG. 4, and this clay was placed into an extrusion machine and extruded in a honeycomb shape. Next, the cells were alternately plugged with a slurry of the cordierite forming raw material at the opposite end faces in which the cells were opened. This extruded body was dried and subsequently fired to prepare a honeycomb structure having a diameter of 144.0 mm, length of 152.0 mm, partition wall thickness of 300 μm, and cell density of 300 cells/square inch (46.5×10$^{-2}$ cells/mm$^2$).

Examples 2 and 3

As Example 2, a honeycomb structure was prepared in the same manner as in Example 1 except that the central portion clay was formed of Clay C and the outer peripheral portion clay was formed of Clay B. As Example 3, a honeycomb structure was prepared in the same manner as in Example 1 except that the central portion clay was formed of Clay A and the outer peripheral portion clay was formed of Clay D.

Comparative Example 1

A honeycomb structure was prepared in the same manner as in Example 1 except that both the central portion and the outer peripheral portion were formed of Clay E.

(Measurement of Pore Diameter and Porosity)

The porosities and pore diameters of the central and outer peripheral portions of the honeycomb structures obtained in Examples 1 to 3 and Comparative Example 1 were measured. The pore diameters were measured using a mercury porosimeter manufactured by Micromeritics Instrument Co., and the porosity was calculated from a total pore volume obtained by the same porosimeter assuming that a true specific gravity of cordierite was 2.52 g/cc. The results are shown in Table 2.

TABLE 2

|  | Central portion | | Outer peripheral portion | |
|---|---|---|---|---|
|  | Porosity (%) | Pore Diameter (μm) | Porosity (%) | Pore Diameter (μm) |
| Example 1 | 65 | 20 | 60 | 25 |
| Example 2 | 60 | 25 | 65 | 20 |
| Example 3 | 60 | 20 | 65 | 25 |
| Comparative Example 1 | 61 | 21 | 61 | 21 |

(Evaluation of the Honeycomb Structures)

Comparison of Example 1 with Comparative Example 1

Air was passed through the honeycomb structures obtained in Example 1 and Comparative Example 1 at a flow rate of 2.4 Nm$^3$/min in a state in which soot was deposited in the structures, and a flow rate distribution in the vertical direction with respect to the air flow was measured at a downstream side of the honeycomb structure. As a result, a substantially uniform flow rate distribution of the honeycomb structure obtained in Example 1 was obtained compared with that obtained in Comparative Example 1. Moreover, a burner was used to check a time until the central portion of the honeycomb structure reached 300° C. which was an example of catalyst activation temperature. The test was carried out by passing a combustion gas of 600° C. through the honeycomb structure with a flow rate of 2.4 Nm$^3$/min. At this time, a time from when the gas started to flow until the central portion of the honeycomb structure reached 300° C. was measured. As a result, the honeycomb structure obtained in Example 1 could shorten the time required until the central portion reached 300° C. by about 10% as compared with the honeycomb structure obtained in Comparative Example 1.

Comparison of Example 2 with Comparative Example 1

For the honeycomb structure obtained in Example 2, as compared with that obtained in Comparative Example 1, the flow rate distribution of the vertical direction with respect to the air flow was measured at the honeycomb structure downstream side in the same manner as in the above-described (Comparison of Example 1 with Comparative Example 1). As a result, the substantially uniform flow rate distribution in the honeycomb structure obtained in Example 2 was obtained compared with that obtained in Comparative Example 1. The honeycomb structures were mounted on an exhaust system of an in-line four-cylinder common rail type direct injection diesel engine having a displacement of 2000 cc. Then depositing of soot and regeneration of the honeycomb structures were carried out. It is to be noted that to regenerate the honeycomb structure, the fuel injected into the engine combustion chamber by post injection was burnt by a honeycomb type oxide catalyst disposed on a honeycomb structure upstream side to generate heat and burn the soot deposited in the honeycomb structure by the heat. A maximum temperature inside the honeycomb structures at the time of the regeneration were measured. The honeycomb structure obtained in Example 2 could lower the maximum temperature (° C.) by about 10% as compared with that obtained in Comparative Example 1.

Comparison of Example 3 with Comparative Example 1

Air was passed at a flow rate of 2.4 Nm$^3$/min to check a pressure loss between the upstream and downstream sides of the honeycomb structures obtained in Example 3 and Comparative Example 1 in a state in which the soot was deposited in the honeycomb structures. As a result, pressure loss lowered by about 20% in the honeycomb structure of Example 3 as compared with that of Comparative Example 1. Moreover, a regeneration test was carried out using the engine in the same manner as in the above-described (Comparison of Example 2 with Comparative Example 1), and the maximum temperature inside the honeycomb structure lowered by about 10% in the honeycomb structure of Example 3 as compared with that obtained in Comparative Example 1. Furthermore, at this time, the time from when the gas started to flow until the outer peripheral portion of the honeycomb structure reached 300° C. which was an example of catalyst activation temperature was measured. As a result, the time shortened by about 15% in the honeycomb structure of Example 3 as compared with that of Comparative Example 1.

As described above, in a honeycomb structure in a first aspect of the present invention, it is possible to reduce a maximum temperature at the time of regeneration. For a honeycomb structure in a second aspect, a time required until temperature reaches a catalyst activation temperature at the time of the regeneration can be shortened, and particulate matter can quickly be burnt. Therefore, the honeycomb structure of the present invention is preferably usable as a filter for purifying an exhaust gas, such as DPF, or a catalyst carrier.

What is claimed is:

1. A honeycomb structure comprising: porous partition walls disposed so as to form a plurality of cells extending in an axial direction, wherein defining that a porosity of the partition walls in a central portion of a vertical section with respect to the axial direction of the honeycomb structure is Pi (%) and that a porosity of the partition walls in an outer peripheral portion of the section is Po (%), a relation is Pi<Po, wherein the honeycomb structure is a monolithical structure and a difference between Pi (%) and Po is within a range of about 3–10%.

2. The honeycomb structure according to claim 1, wherein defining that a pore diameter of the partition walls in the central portion is Di and that a pore diameter of the partition walls in the outer peripheral portion is Do, a relation is Di>Do.

3. The honeycomb structure according to claim 1, wherein defining that a pore diameter of the partition walls in the central portion is Di and that a pore diameter of the partition walls in the outer peripheral portion is Do, the Di and Do have a relation of Di<Do.

4. A honeycomb structure comprising: porous partition walls disposed so as to form a plurality of cells extending in an axial direction, wherein defining that a porosity and a pore diameter of the partition walls in a central portion of a vertical section with respect to the axial direction of the honeycomb structure are Pi (%) and Di and that a porosity and a pore diameter of the partition walls in an outer peripheral portion of the section are Po (%) and Do, relations are Pi>Po and Di<Do, wherein the honeycomb structure a is monolithical structure and a difference between Pi (%) and Po is within a range of about 3–10%.

5. The honeycomb structure according to claim 1, wherein a predetermined cells are plugged at either of end faces of the honeycomb structure.

6. The honeycomb structure according to claim 2, wherein a predetermined cells are plugged at either of end faces of the honeycomb structure.

7. The honeycomb structure according to claim 3, wherein a predetermined cells are plugged at either of end faces of the honeycomb structure.

8. The honeycomb structure according to claim 4, wherein a predetermined cells are plugged at either of end faces of the honeycomb structure.

9. The honeycomb structure according to claim 2, wherein defining that a pore diameter of partition walls in an intermediate portion is Dm, the intermediate portion being between the central portion and the outer peripheral portion, a relation is Di>Dm>Do.

* * * * *